(12) United States Patent
Chafe et al.

(10) Patent No.: US 7,669,137 B2
(45) Date of Patent: Feb. 23, 2010

(54) COMPUTER METHOD AND APPARATUS FOR REPRESENTING A TOPIC IN A SOFTWARE MODELING SYSTEM

(75) Inventors: Stephanie L. Chafe, Ottawa (CA); Daniel D. Leroux, Redcar Crescent (CA); Christie B. McGee, Carp (CA); Steven R. Shaw, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 11/267,626

(22) Filed: Nov. 4, 2005

(65) Prior Publication Data

US 2007/0106974 A1  May 10, 2007

(51) Int. Cl.
*G06F 3/048* (2006.01)
(52) U.S. Cl. .................. 715/763; 717/104; 717/105; 717/109
(58) Field of Classification Search .......... 717/104, 717/105, 109; 715/705, 708, 762, 763
See application file for complete search history.

(56) References Cited

U.S. PATENT DOCUMENTS

| 5,897,642 | A | 4/1999 | Capossela et al. | |
|---|---|---|---|---|
| 6,226,652 | B1 | 5/2001 | Percival et al. | |
| 6,259,445 | B1 * | 7/2001 | Hennum et al. | 715/709 |
| 6,609,123 | B1 * | 8/2003 | Cazemier et al. | 707/4 |
| 6,832,237 | B1 * | 12/2004 | Christensen et al. | 709/200 |
| 2004/0044635 | A1 * | 3/2004 | Gordon et al. | 706/50 |
| 2005/0055348 | A1 * | 3/2005 | Deimel et al. | 707/6 |

* cited by examiner

*Primary Examiner*—Kieu Vu
*Assistant Examiner*—Omar Abdul-Ali
(74) *Attorney, Agent, or Firm*—Hamilton, Brook, Smith & Reynolds, P.C.

(57) ABSTRACT

A computer method and apparatus for visual modeling software programs represents a topic by providing a respective topic diagram. The topic diagram is non-editable and has non-persisting notation data. The topic diagram demonstrates a respective set of relationships between one or more given elements representative of the subject topic. The topic diagram is derived based on a query which saves search criteria and information that enables an editor to generate the diagram notation data. There are different topic providers for different queries. A topic service manages the topic providers and processes client calls (requests) regarding specific context and query. Queries are end-user customizable and are extensible per topic.

20 Claims, 6 Drawing Sheets

COMPUTER METHOD AND APPARATUS FOR REPRESENTING A TOPIC IN A SOFTWARE MODELING SYSTEM

BACKGROUND OF THE INVENTION

In the software industry, designing of software programs typically begins with a modeling stage of the subject system. The UML is a visual modeling language (with formal syntax and semantics) for communicating a model or conceptualization. The UML syntax enables software designers to express (specify and document) the subject problems and solutions in a standardized manner. The UML semantics enable knowledge about the subject system to be captured and leveraged during the problem solving phase.

In that light, in UML or modeling languages generally, diagrams can be described as a graphical view on some semantic data. They are used to visualize the data in a way that is understandable to the user. An example is the UML class diagram. A diagram's purpose is to convey some specific aspect or topic about the data it is displaying. Typically the user describes this topic when he is creating the diagram using a tool. Briefly, diagramming tools are used to create and maintain diagrams. Tools typically maintain consistency across diagram types.

Topics can be generated or contributed from a variety of places. A tool in the user's environment could contribute topics. The topics that are available can change based on the user's selected context and availability of tools in the user's environment.

In the case of a UML class diagram, the user may wish to create an inheritance diagram of a particular class. The user may use a tool to create a view of the class and then expand on its relationships based on the generalization relationship type. Once completed, the user has a nice diagram that describes the topic of inheritance for the context of the initial class. The problem is that the core knowledge of what the topic the diagram is trying to represent resides in the user's mind. The user may add notes to the diagram to give an indication of its purpose, but the diagram has no innate knowledge of the topic it is trying to represent. Consequently, if the inheritance of the class changes or new classes are added to the inheritance tree, the user must go back and manually maintain the diagram to keep its topic synchronized with the underlying model.

In order to persist a diagram, one needs to store a set of graphical elements that can represent the nodes and arcs (boxes/lines) that form the context that is displayed. In the UML class diagram example, when a user adds a class or generalization view to the diagram, this is adding a notation element that stores the particular layout constraints (position, extend/bend-points, etc.). So the file for the class diagram topic would contain a set of notation elements for the class views and generalization connections with corresponding semantic references to the elements they represent. Any time that information is persisted to a common file, introduces issues in a team development environment that is under source control (source files are checked into a source control system such as CVS or ClearCase). Team members can concurrently make edits to the common file which can precipitate conflicts and resulting merges when the edits are checked in to the source control system. Merges are inherently a dangerous operation that should be avoided if at all possible.

SUMMARY OF THE INVENTION

The present invention addresses the problems of the prior art. In a preferred embodiment, the present invention provides a computer method, system, program product and apparatus for visual modeling software programs. The invention method/apparatus includes computer implemented steps of:

(1) representing a subject topic by providing a respective topic diagram, and (2) deriving and generating the topic diagram based on a query.

The topic diagram is generated from persisted query information. At least initially the topic diagram is a non-editable diagram and has non-persisting notation data. The purpose of the topic diagram is to demonstrate a respective set of relationships between one or more given elements all of which are representative of a subject topic. The query saves the search information or criteria that allows an editor to generate the diagram notation data.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Applicants' approach is to consider the original problem (e.g., a diagram that represents the inheritance tree of a particular class) and then conceptualize the diagram as a "topic", i.e., expand <class> by n with constraint of relationship <type>. This is all the information the user needs in order to manually generate the diagram and save the diagram notation elements. As used herein, "notation elements" are the data objects that store information about how to display underlying semantic elements (UML2). For example, this information includes size, position, color, etc. However, if this information in the form of a "topic" query is all that is needed to generate the diagram, why is it necessary to persist the diagram notation elements? As noted above, persisting the diagram notation elements can cause issues with check-in conflicts that are sometimes difficult to resolve. If the diagram has knowledge of the query in an understandable format, then the only prerequisite is that the diagram is able to generate and update itself based on the query information. Then there is no longer any need to save the diagram notation elements, only the query needs to be stored in whatever format can be parsed and understood by the tool (OCL, simple string, etc.).

Additionally, if the diagram notation is not stored, then on subsequent viewings of the diagram, it will always be synchronized with the topic because the diagram has to regenerate itself from scratch whenever it is opened.

In order to self generate a topic diagram, there are a few prerequisites. The diagramming tool must be able to understand and parse a query and create a set of elements and relationships to display based on the query. Next, a series of layout algorithms must be available to the tool that can be applied selectively depending on the specific topic type. This allows the set of elements to be visualized in a manner that makes sense for the topic and/or is visually appealing to the topic diagram consumer. Finally, the diagram must be made non-editable. Since the diagram notation elements are not persisted, just the query string is, the user cannot persistently edit the individual diagram elements properties such as location, size or color attributes. To edit these implies that the notation element must be persisted, which would defeat this solution for team based workflows and automatic update. In some embodiments, a user may move elements around if the layout is not optimal and/or collapse compartments to clear real estate with a warning that these changes will not be persisted.

Topics may be contributed from various sources. Other diagramming tools may provide topics that become available to the user if requested. The individual tool may provide one or more topics that are based on its particular domain. Also, the tool writers could provide a certain degree of customizability for their topics.

The present invention topic diagram concept is different from a regular diagram in that it is non-editable and does not persist notation data. A view of the topic diagram is generated based on a query that the end-user defines. The query saves the search information or criteria that allows an editor to derive and generate the diagram notation data.

A topic diagram view is displayed using a topic diagram editor. This view is a non-editable view that demonstrates a specific set of relationships between a group of given elements. For instance, an inheritance topic for an element illustrates the inheritance tree to a specific number of levels.

The topic diagram view can be refreshed to reflect the latest elements in a given project and saved/opened as a regular editable diagram. As actions, such "refresh" and "save as" are triggered by user gestures. Details of supporting infrastructure and end-user use of particular embodiments of the present invention follow.

Figure 4:
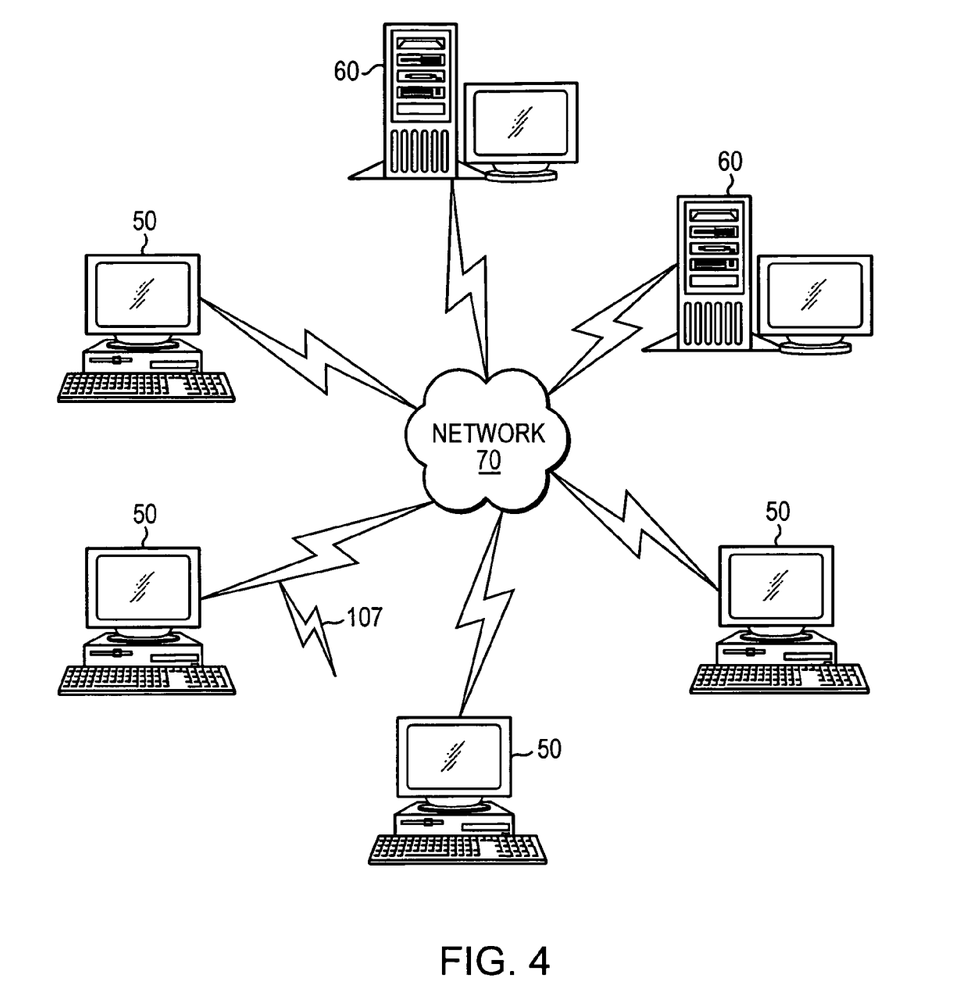
FIG. 4 is a schematic view of a computer network in which embodiments of the present invention are deployed.

By way of introduction, FIG. 4 illustrates a computer network or similar digital processing environment in which embodiments of the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
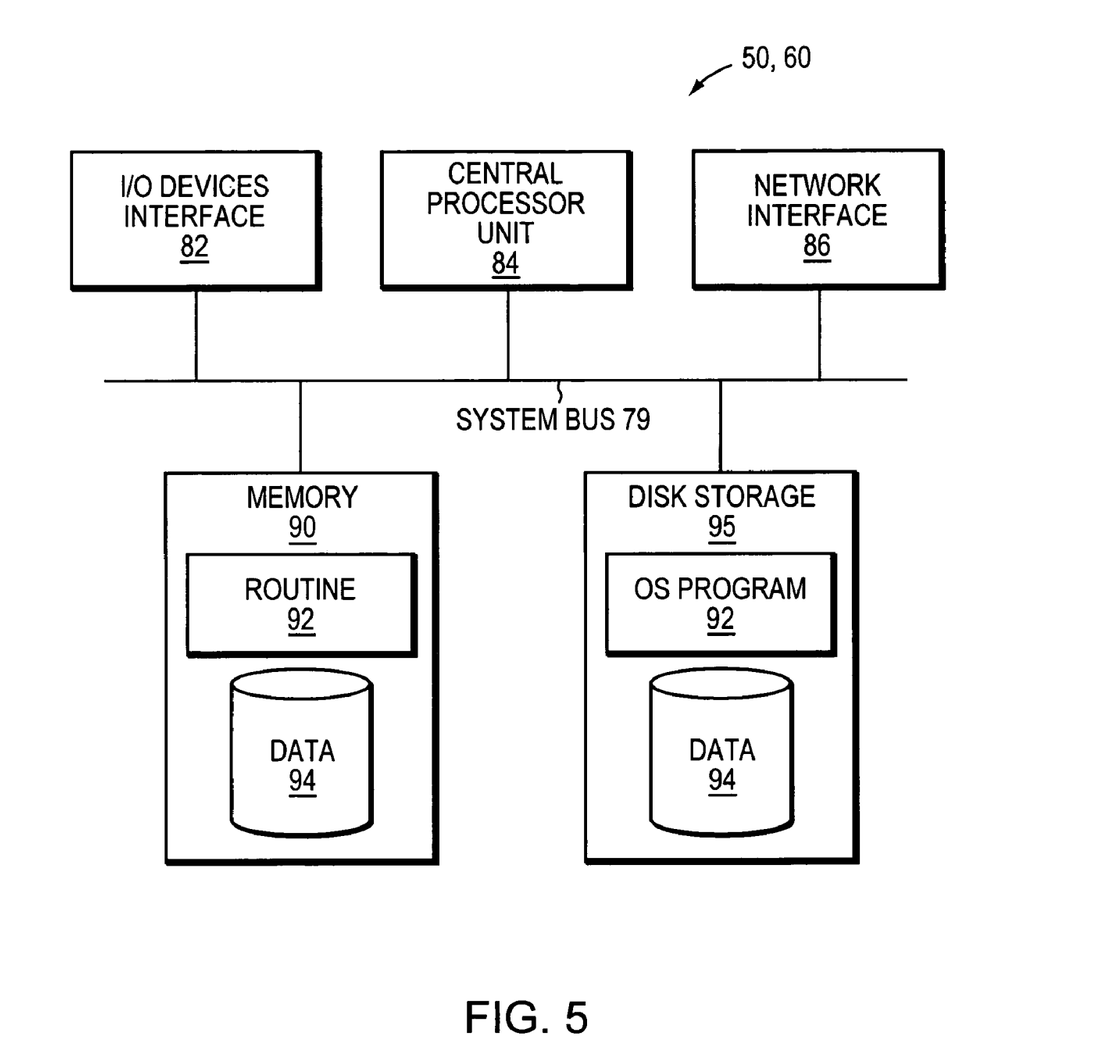
FIG. 5 is a block diagram of a computer node in the network of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., topic diagram 29, corresponding query 17 for generating the topic diagram, and supporting structures 11, 13, managers 31 and user interface 20 further detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes or tapes) that provides at least a portion of the software instructions for the 20 invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
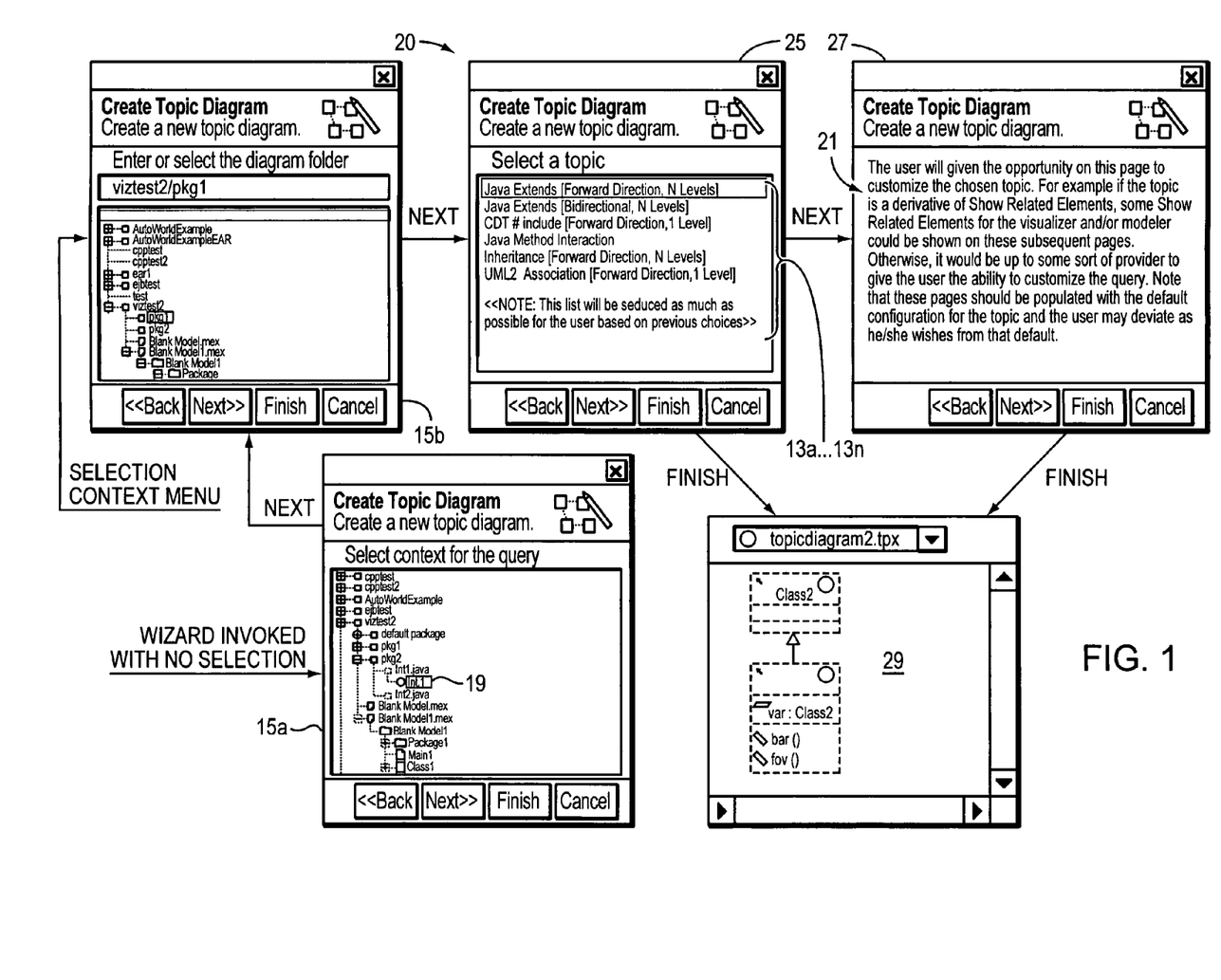
FIG. 1 is a schematic illustration of topic diagram creation workflow in a preferred embodiment.

The primary purpose of the present invention topic diagram 29 (FIG. 1) is to present a topic 13. This topic is a very high level abstract concept. As will be made clear below, a topic 13 effectively defines the scope of a particular concept that queries are constrained to. For example, one topic is the relationships of a context element. Preferably, topics 13 are identified by respective short phrases. Examples are "Java Inheritance, N levels deep, both directions," or "All Usages, 1 level, From Consumer to Supplier," or "Java Interactions." FIG. 1 is illustrative (see 'Select a Topic' dialogue screen 25) and further discussed below.

Each topic 13 requires providers to provide the necessary functionality to produce the respective diagram 29 of that topic on a given context (user-selected model elements) 19. Certain providers may only be capable of providing a topic 13 for only a subset of all possible contexts 19. Other providers may not require any user-selectable context at all for their topics. Thus, overall, a provider knows how to satisfy requests to provide topics 13 for specific contexts 19.

Figure 2:
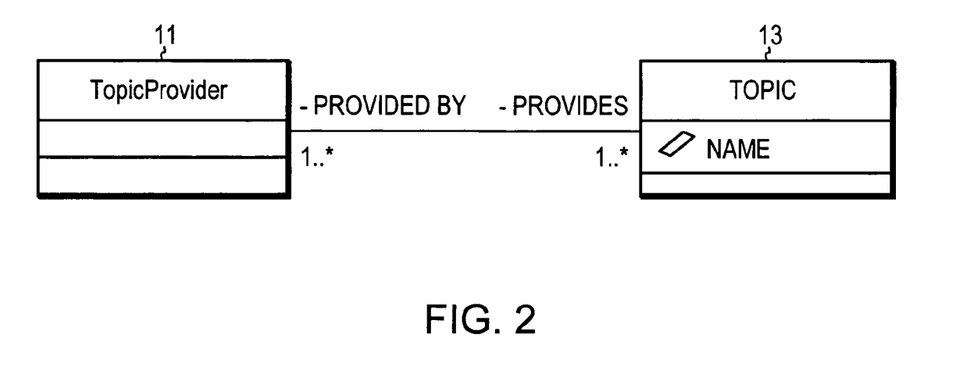
FIG. 2 is a block diagram of Topic Provider and Topic classes supporting the embodiment of FIG. 1.

FIG. 2 illustrates supporting class structures of providers 11 and topics 13 in the preferred embodiment. It is reasonable to assume that there may be more than one provider for a given topic 13. Also, a provider may provide to more than one topic 13. Each provider may contribute commands to populate the topic diagram 29. To avoid conflicts, for each topic 13 a respective single provider is chosen to serve as "topic provider" 11.

A topic provider 11 usually requires more data than a topic 13 does in order to populate a respective topic diagram 29. A topic provider 11 may require some context 19 (FIG. 1). This context is the model elements that the topic 13 is to be executed against to provide the data for the corresponding topic diagram 29. A topic 13 may have multiple context elements. As discussed further below, this context 19 is stored in a way that the topic provider 11 can use it at any time to populate the topic diagram 29.

Figure 3:
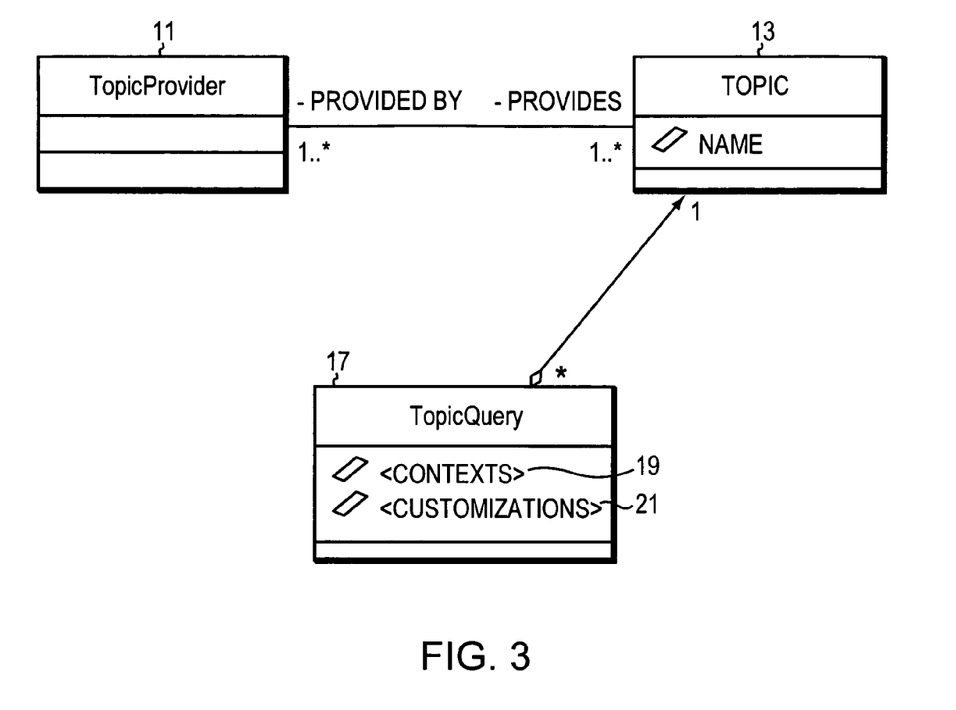
FIG. 3 is a block diagram of a topic query class for the Topic Provider and topic classes of FIG. 2.

A topic provider 11 may provide some customizability (screen 27, FIG. 1) to the default topic 13. An end-user may wish to customize the topic 13 in certain ways to suit his needs. These customizations 21 are passed to the topic provider 11 when the topic provider is asked to populate a corresponding topic diagram 29. This necessitates the existence of another object 17 whose purpose is to (i) contain all the data that is needed to get a list of providers (a context 19 and topic 13 that a provider 11 recognizes) and (ii) store the customizations 21 that the end-user has made to the topic 13, if any. Such an object 17 is termed a "topic query" and is illustrated in FIG. 3.

A topic 13 may be thought of as a template and then the topic query 17 is an instance of the template with certain parameters. Thus topic query 17 references a respective topic 13 and the topic query 17 is versatile enough to store the information for a variety of uses (providers). The topic query 17 in a preferred embodiment accomplishes this without having all of the data members to form a union of all providers' requirements. If this were allowed, every new provider that persisted different information than all of the other providers would require the modification of the query class. Changes of this sort should be kept to a minimum. Plus, topic query objects 17 (i.e., instances of the topic query class) would eventually become large and occupy more memory than what is currently needed.

Therefore, the topic query 17 class provides a generic data store mechanism. Any provider can store any data in any location and recall that data on demand when asked by an end-user to perform the query. Further, by storing individual use customizations 21, topic queries 17 are extensible per topic 13.

An additional requirement of the topic query 17 is that it is persistent. This persisted data is usable between invocations of the Java virtual machine. Therefore, all data in the topic query 17 is serializable including the specific context 19 and the specific topic 13. This allows the topic query 17 data to be serialized to disk to form a "topic diagram" 29. Thus, each topic query 17 is a particular instance of a topic 13 that has certain parameters to define concretely how to generate a specific topic diagram 29. In one embodiment, topic query 17 is stored in a .emx file for the modeling subsystem or in a .tpx file for visualizer subsystems.

Given the structures of FIGS. 2 and 3, use of the present invention by an end-user designing a subject software program in a visual modeling environment is as follows. Employing a diagram editor 10 of the visual modeling system, the end-user interacts with the model diagram representing the subject software program. The model diagram includes various model elements and indications of element relationships/interrelationships. A wizard or similar routine 20 (FIG. 1) of the editor 10 enables the end-user to recall and/or customize topic queries 17 for respective topics 13 (i.e., to enable editor 10 to generate the corresponding topic diagrams 29). The wizard 20 prompts the end-user to select/specify specific topic 13 and hence specific topic query 17 based on given context elements 19. This prompting is accomplished in the preferred embodiment through dialogue boxes and working windows 15a, 15b and 25 (indicating particular context 19 and topic 13 respectively) shown in FIG. 1.

Similarly wizard 20 provides a customization screen 27 which prompts and enables the end-user to add customizations 21 to a subject topic query 17. Customizations 21 include, but are not limited to, specifying which relationships or types of relationships to display or not display, specifying the number of levels to expand to (based on context 19), specifying direction to expand (supplier to consumer, consumer to supplier, or both) and specifying or changing other parameters of the query 17. Thus topic queries 17 are extensible per topic 13.

In a preferred embodiment a topic service 31 (FIG. 6) is a central manager which delegates requests (such as getting topics 13 for a given context 19) to an appropriate topic provider 11. The topic service 31 links providers of topics 13 to editors 10 and wizards 20 that handle the persistence and presentation of the topic queries 17. The topic providers 11 are implementation clients that respond to topic requests. Different clients (topic providers 11) contribute different queries 17 and depending on domain of a topic query 17, there may be a certain topic provider 11 for that domain. Thus, the service 31 allows topic providers 11 to register themselves (e.g., through XML).

Figure 6:
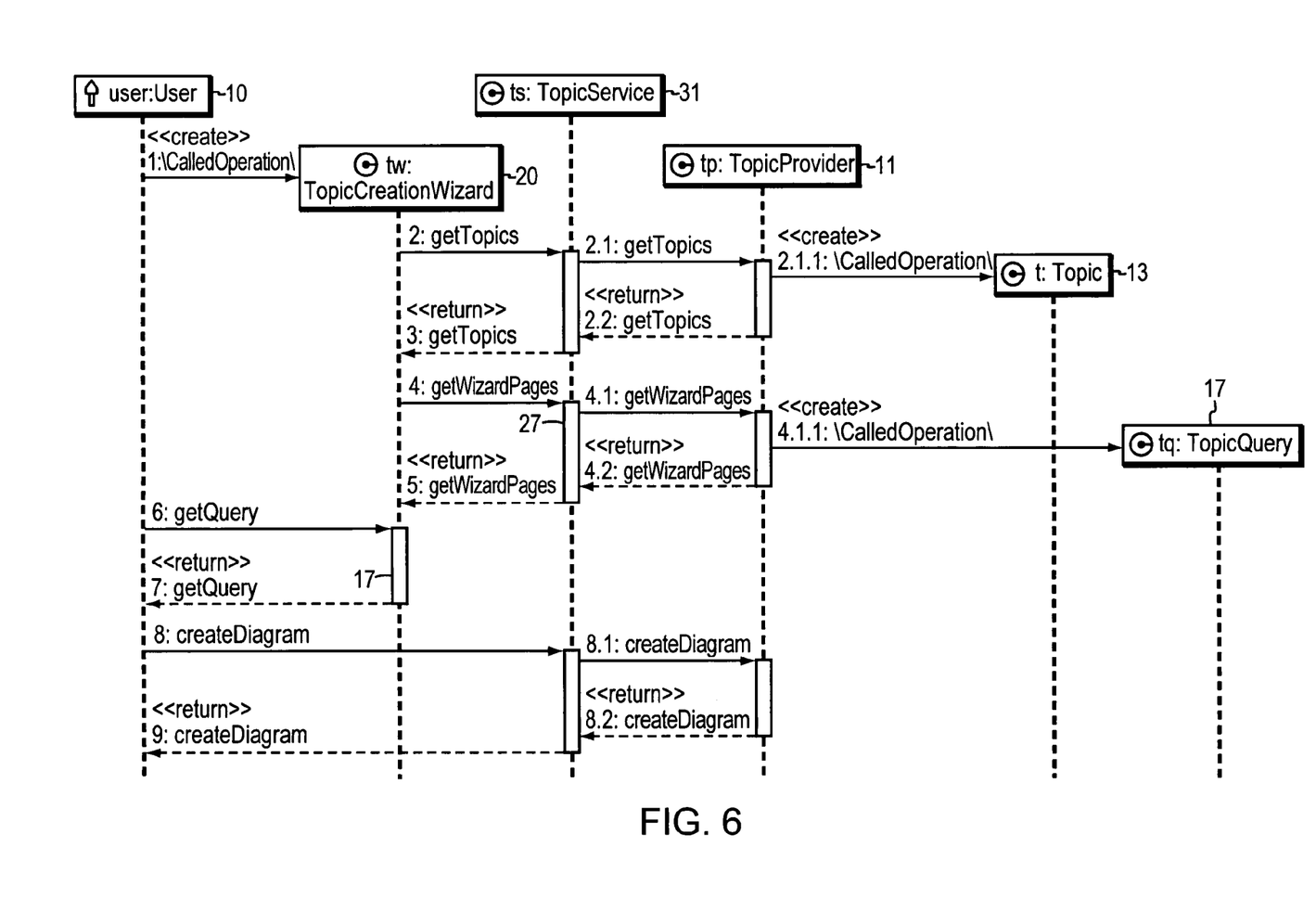
FIG. 6 is a block diagram of a topic service in the embodiment of FIG. 1.

With reference to FIG. 6, at step 1, diagram editor 10 initiates wizard 20 which, as described above in FIG. 1, will prompt the end-user for the topic 13 and the specific parameters of the topic 13 that will construct the topic query 17. At step 2 wizard 20 calls the topic service 31 to retrieve the topics 13 relevant for the specific context 19. In response, the topic service 31 polls the available topic providers 11 to contribute topics 13 that are relevant for the given context 19. This results in a list of topics 13 (at step 3) that wizard 20 displays in screen 25 (FIG. 1) for selection by the end-user.

Next (at step 4), wizard 20 calls the topic service 31 after the end-user has chosen a specific topic 13 to retrieve the customization pages 27 that will allow the end-user to define the parameters of the particular topic query 17. Topic service 31 notifies the corresponding topic provider 11 of the selected topic 13 and obtains the corresponding default topic query 17 for return and display (step 5) with wizard customization pages 27.

Once the topic query 17 is defined (with customizations 21, topic 13 and context 19 as specified by the end-user through wizard 20 interface) at steps 6 and 7 of FIG. 6, the editor 10 calls (step 8) the topic service 31 to generate a diagram 29 based on the specific query 17. In turn, topic service 31 notifies corresponding topic provider 11 and topic provider 11 provides a GEF or similar command given topic query 17 containing one of its topics 13.

An example of the topic provider 11 interface is as follows.

```
/**
 * Get a list of topics that are supported for the given
       selection.
 *
 * @param selection A structured selection representing a
       potential context for a topic
 * @return A list of Topic objects representing the supported
       topics.
 */
    public Topic [ ] getTopics (IStructuredSelection selection);
/**
 * Get wizard pages from the provider of the topic to display in
       the wizard. Each of these pages could add various data to
       the query when the user chooses to click "Finish" on the
       wizard.
 *
 * @param topic A topic for which the wizard pages should be
       directed.
 * @return A set of wizard pages to be added to the topic
       wizard.
 */
```

-continued

```
    public ITopicWizardPage[ ] getWizardPages (Topic topic);
/**
 * Gets the command to populate an editor. NOTE: The editor
       provided is to be used to get a command from a request and
       should not be used directly.
 * @param query A topic query to be used to generate the
       command.
 * @param part An edit part that may optionally be used to
       resolve a request to a command.
 * @return A command that can be executed on the editor to
       populate it with the results of the topic.
 */
    public Command getPopulateCommand (TopicQuery query,
    GraphicalEditPart part);
```

As discussed above, clients of the topic service 31 include editors 10 and wizards 20 that wish to make use of topics 13. Wizard 20 gathers a structured selection from the end-user using screens 15a, b and passes that selection to the service 31 to gather a list of topics 13. Once the user has selected a topic 13 from screen page 25, the service 31 is consulted to provide wizard pages 27 for that topic 13 to allow for customizations 21. When the end-user gestures to complete the creation (and render a view) of the topic diagram 29 (for example, by selecting the 'Finish' button), the wizard pages 27 are consulted to populate the corresponding topic query 17 with customizations 21 and contexts 19. The diagram editor 10 makes use of the provided topic query 17 (deserialized from disk, provided through the topic service 31, etc.) and gets a GEF (or similar) command from the topic service 31 so that it can populate its otherwise empty diagram.

Also as described above, wizard pages 15, 25, 27 are provided upon request of the topic service 31 given a topic 13. It is the responsibility of the topic provider 11 to provide appropriate wizard pages 15, 25, 27 for the given topic 13. In general, a wizard page 15, 25, 27 is allowed to perform any end-user interface functions that an eclipse wizard page would but must preferably conform to the following Wizard Page interface.

```
/**
 * Populate the wizard page with the values stored in the query.
       Please note that this should not be an opportunity to keep a
       reference to the topic query instance. The instance of the
       query may or may not be the same instance used to perform
       the finish.
 * @param query A topic query used to populate the wizard page.
 */
    public void populateFromQuery (TopicQuery query);
/**
 * Populate the wizard page with information from the
       selections. The context could change and this method could
       be invoked more than once.
 *
 * @param context The context selection.
 /
    public void populateFromContext (IStructuredSelection context);
/**
 * Perform finish and place all necessary data into the topic
       query so that it may be persisted.
 *
 * @return Success or failure.
 */
    public boolean finish(TopicQuery query);
```

The above interface enforces that a wizard page 15, 25, 27 additionally refreshes its controls with the customization data 21 inside a provided topic query 17. Also, the wizard page 15, 25, 27 populates its controls with data derived from the given context 19. This context can be cached inside the wizard page 15 in order to later store that context 19 in the topic query 17.

Topic wizard pages 15, 25, 27 are only given access to the final topic query 17 on two occasions. The wizard 20 may provide a topic query 17 because the topic query already exists and the end-user has somehow gestured to customize this query 17. In this case, the "populateFromQuery" method is invoked on the wizard page so that it may set the state of its controls to match the customizations 21 already stored in the query 17. This is not an opportunity to keep a reference to the topic query 17. This topic query 17 may be altered by other wizard pages 15, 25, 27 or by the topic wizard 20 itself. The only time that the topic wizard page 15, 25, 27 should place any data into the topic query 17 is when its "finish" method is invoked and the topic wizard 20 is finishing up and gathering all of the changes to the topic query 17.

Accordingly, the present invention provides a computer implemented method and apparatus for displaying a diagram topic based on a query. The query search information (criteria) enables an editor to derive notation elements for the class and connector views as well as the corresponding references to the model elements they represent. The query is stored in appropriate system/module files. By providing and structuring topic queries 17, the present invention spares the overhead of persisting notational and semantic reference data, thus allowing for an efficient way to quickly generate a diagram 29 using minimal file storage. The topic query 17 information is not being provided to enable network and database server accessibility to software project objects. Rather, it is a means to quickly generate a diagram 29 based on specific parameters. Neither is the topic query 17 being used to export modeling and diagram files to a version control system. It is not a text based version of a modeling or diagram file. The present invention topic query 17 is stored as a query and does not store the same information as editable diagrams. One of the benefits of a topic query of the present invention is that minimal information is stored to generate a diagram 29, thereby reducing the potential for version merge conflicts.

While this invention has been particularly shown and described with references to preferred embodiments thereof, it will be understood by those skilled in the art that various changes in form and details may be made therein without departing from the scope of the invention encompassed by the appended claims.

For example, the computer architecture of FIGS. 4 and 5 are for purposes of illustration and not limitation. Other computer architectures, network configurations, platforms, etc. are suitable for carrying out the present invention.

Other advantages of the present invention include the following. As the topic diagrams persist query information and not notation data, the resulting files generated are less complex and easier to manage. The focus of the invention topic diagram is the subject or "topic" and not the notational elements.

What is claimed is:

1. A method for visually modeling software, comprising computer implemented steps of:
   representing a subject topic by providing a respective topic diagram, the topic diagram being non-editable and having non-persisting notation element data objects, the topic diagram demonstrating a respective set of relationships between one or more given elements representative of the subject topic;
   deriving the topic diagram from a query form of notation element information, the query saving search criteria that enables the topic diagram to generate and update itself including generating the topic diagram notation element information; and
   displaying the topic diagram as self-generated based on the query.

2. A method as claimed in claim 1 further comprising the step of preparing the query including using user-indicated context.

3. A method as claimed in claim 2 wherein said preparing includes enabling user customizations such that parameters of the query are changed by an end-user.

4. A method as claimed in claim 1 wherein the query is extensible per topic.

5. A method as claimed in claim 1 further comprising employing a topic query class of data for representing the query and for persisting the query.

6. A method as claimed in claim 5 further comprising employing a topic provider that responds to a topic request, different topic providers being utilized for different queries.

7. A method as claimed in claim 6 further comprising managing the topic providers including processing calls regarding a specific context and query.

8. In a visual modeling system having an editor, computer apparatus for visually modeling a software program, comprising:
   a display monitor;
   a topic diagram representing a subject topic, the topic diagram being non-editable and having non-persistent notation element data objects, the topic diagram demonstrating a respective set of relationships between one or more given elements, representative of the subject topic; and
   a query form of notation element information, the query holding search criteria that enables the editor to generate the topic diagram notation element information such that the topic diagram generates and updates itself based on the query, and the editor subsequently displaying the topic diagram as self-generated.

9. Apparatus as claimed in claim 8 wherein the query is end-user customizable such that parameters of the query are able to be changed by an end-user.

10. Apparatus as claimed in claim 8 wherein the query is extensible per topic.

11. Apparatus as claimed in claim 8 further comprising a topic query class of data for representing the query and for persisting the query.

12. Apparatus as claimed in claim 11 further comprising a topic provider that responds to a topic request, different topic providers being utilized for different queries.

13. Apparatus as claimed in claim 12 further comprising a topic service managing the topic providers, the topic service processing calls regarding a specific context and query.

14. Apparatus as claimed in claim 8 wherein the query is prepared for certain use by an end-user through a wizard routine coupled to the editor.

15. A computer system for visual modeling software programs comprising:
   a topic diagram for representing a subject topic, the topic diagram being non-editable and having non-persisting notation element data objects;
   query means providing a query form of notation element information, the query holding search information that enables the topic diagram to generate and update itself including generating the notation element information, such that the topic diagram is self-generated based on the query; and
   display means including a display monitor, rendering a view of the topic diagram as self-generated.

16. A system as claimed in claim 15 wherein the query is end-user customizable such that parameters of the query are able to be changed by an end-user.

17. A system as claimed in claim 15 wherein the query is extensible per topic.

18. A system as claimed in claim 15 further comprising:
a topic query class of data for representing the query and for persisting the query;
a topic provider that responds to a topic request, different topic providers being utilized for different queries; and
a topic service managing the topic providers.

19. A system as claimed in claim 15 further comprising editor routine means coupled to the query means for preparing the query for certain use according to context and user customizations.

20. A computer program product comprising:
a computer usable storage medium having computer readable program code embedded thereon generating and displaying a topic diagram in a visual modeling system, said computer readable program code including:
computer readable program code for representing a subject topic by providing a respective topic diagram, the topic diagram being non-editable and having non-persisting notation element data objects, the topic diagram demonstrating a respective set of relationships between one or more given elements representative of the subject topic;
computer readable program code for deriving the topic diagram from a query form of notation element information, the query saving search criteria that enables the topic diagram to generate and update itself including generating the notation element information; and
computer readable program code implementing display of the topic diagram as self-generated based on the query.

* * * * *

UNITED STATES PATENT AND TRADEMARK OFFICE
CERTIFICATE OF CORRECTION

PATENT NO. : 7,669,137 B2  Page 1 of 1
APPLICATION NO. : 11/267626
DATED : February 23, 2010
INVENTOR(S) : Chafe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1146 days.

Signed and Sealed this

Seventh Day of December, 2010

David J. Kappos
*Director of the United States Patent and Trademark Office*